US012151788B2

(12) United States Patent
Garthwaite

(10) Patent No.: US 12,151,788 B2
(45) Date of Patent: Nov. 26, 2024

(54) ROBOTIC FISH WITH MULTIPLE TORQUE REACTION ENGINES

(71) Applicant: Fishboat Incorporated, Bainbridge Island, WA (US)

(72) Inventor: Martin Spencer Garthwaite, Bainbridge Island, WA (US)

(73) Assignee: Fishboat Incorporated, Bainbridge Island, WA (US)

( * ) Notice: Subject to any disclaimer, the term of this patent is extended or adjusted under 35 U.S.C. 154(b) by 459 days.

(21) Appl. No.: 17/504,172

(22) Filed: Oct. 18, 2021

(65) Prior Publication Data

US 2022/0033043 A1 Feb. 3, 2022

Related U.S. Application Data

(63) Continuation-in-part of application No. 17/222,965, filed on Apr. 5, 2021, now Pat. No. 11,718,377, and a continuation-in-part of application No. 17/160,215, filed on Jan. 27, 2021, now Pat. No. 11,845,522, and a continuation of application No. 16/731,038, filed on Dec. 31, 2019, now Pat. No. 11,148,773, said application No. 17/222,965 is a continuation of application No. 15/942,545, filed on Apr. 1, 2018, now Pat. No. 10,967,944.

(60) Provisional application No. 62/966,081, filed on Jan. 27, 2020, provisional application No. 62/787,253, filed on Dec. 31, 2018, provisional application No. 62/480,167, filed on Mar. 31, 2017.

(51) Int. Cl.
*B63G 8/00* (2006.01)
*B25J 11/00* (2006.01)
*B63H 1/12* (2006.01)

(52) U.S. Cl.
CPC .............. *B63G 8/001* (2013.01); *B25J 11/00* (2013.01); *B63H 1/12* (2013.01); *B63G 2008/002* (2013.01)

(58) Field of Classification Search
CPC .................................................. B63G 8/001
See application file for complete search history.

(56) References Cited

U.S. PATENT DOCUMENTS

| | | | | |
|---|---|---|---|---|
| 5,237,952 A * | 8/1993 | Rowe | ....................... | B63G 8/12 |
| | | | | 114/280 |
| 6,814,634 B2 * | 11/2004 | Roberts | .................. | B63H 11/08 |
| | | | | 440/38 |
| 6,835,108 B1 * | 12/2004 | Gieseke | .................. | B63H 1/30 |
| | | | | 440/14 |
| 7,822,552 B2 * | 10/2010 | Bittleston | ............ | G01V 1/3826 |
| | | | | 702/14 |
| 9,032,900 B2 * | 5/2015 | Glezer | ..................... | B63G 8/14 |
| | | | | 114/321 |
| 9,822,757 B2 * | 11/2017 | Magnell | .................. | F03B 13/10 |
| 9,944,363 B2 * | 4/2018 | Venables | .............. | G05D 1/0875 |
| 2008/0087762 A1* | 4/2008 | Holloman | .............. | B64U 10/30 |
| | | | | 244/30 |

(Continued)

*Primary Examiner* — S. Joseph Morano
*Assistant Examiner* — Jovon E Hayes
(74) *Attorney, Agent, or Firm* — Martin Spencer Garthwaite

(57) ABSTRACT

A robotic fish comprises one or more torque reaction engines and a fish body, wherein the torque reaction engine cyclically oscillates and causes a wave to propagate across the fish body, including through a flexible wing, accelerating thrust fluid and propelling the robotic fish.

10 Claims, 5 Drawing Sheets

(56) References Cited

U.S. PATENT DOCUMENTS

| | | | | |
|---|---|---|---|---|
| 2010/0151751 A1* | 6/2010 | Jemt | ..................... | B63H 1/36 |
| | | | | 440/14 |
| 2012/0145066 A1* | 6/2012 | King | ..................... | F42B 10/38 |
| | | | | 114/333 |
| 2013/0239869 A1* | 9/2013 | Hesse | .................. | E02F 3/9243 |
| | | | | 362/477 |
| 2014/0261129 A1* | 9/2014 | Garthwaite | ............ | B63H 25/02 |
| | | | | 114/123 |
| 2015/0081146 A1* | 3/2015 | Geder | ...................... | B63H 1/37 |
| | | | | 901/1 |
| 2016/0304179 A1* | 10/2016 | Garthwaite | ............. | B63B 21/56 |
| 2018/0312234 A1* | 11/2018 | Garthwaite | ............. | B63C 11/46 |
| 2018/0342938 A1* | 11/2018 | Fei | ........................... | B63H 1/36 |
| 2019/0152573 A1* | 5/2019 | Wiens | .................... | B63G 8/001 |
| 2019/0351986 A1* | 11/2019 | Garthwaite | .............. | B63H 1/36 |
| 2019/0360510 A1* | 11/2019 | Broers | .................... | B32B 15/08 |
| 2020/0255108 A1* | 8/2020 | Garthwaite | .............. | B63G 8/08 |

\* cited by examiner

ROBOTIC FISH WITH MULTIPLE TORQUE REACTION ENGINES

CROSS-REFERENCE TO RELATED APPLICATIONS

This application is a continuation of and claims the benefit of and incorporates by reference the content and subject matter of U.S. patent application Ser. No. 16/731,038, titled, "Robotic Fish with Multiple Torque Reaction Engines", filed 2019 Dec. 31; U.S. patent application Ser. No. 16/731,038 is a non-provisional of U.S. provisional patent application Ser. No. 62/787,253, filed 2018 Dec. 31, titled, "Robotic Fish with Multiple Torque Reaction Engines"; this application is a continuation in-part of U.S. patent application Ser. No. 17/160,215, filed 2021 Jan. 27, titled, "Robotic Fish with One or More Torque Reaction Engines"; U.S. patent application Ser. No. 17/160,215 claims priority from U.S. provisional patent application Ser. No. 62/966,081, filed 2020 Jan. 27; this application further is a continuation-in-part of U.S. patent application Ser. No. 17/222,965, filed 2021 Apr. 5, titled, "Robotic Eel"; U.S. patent application Ser. No. 17/222,965 is a continuation of U.S. patent application Ser. No. 15/942,545, filed 2018 Apr. 1, titled, "Robotic Eel"; U.S. patent application Ser. No. 15/942,545 was a non-provisional of U.S. provisional patent application Ser. No. 62/480,167, filed 2017 Mar. 31. This application claims the benefit of and incorporates by this reference the subject matter of the foregoing applications.

SUMMARY

Figure 1A:
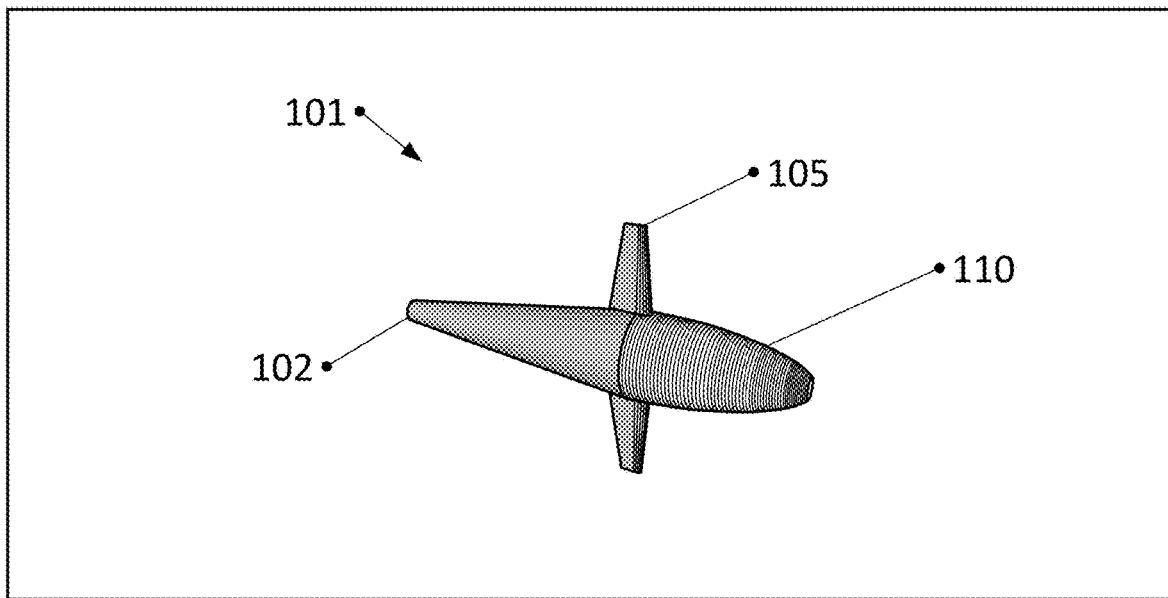
FIG. 1A illustrates an example of a robotic fish including at least one torque reaction engine.

Certain of the inventions disclosed herein comprise systems and apparatus to accelerate thrust fluid with fore and aft portions of a wing driven separately by two or more torque reaction engines (TREs).

DETAILED DESCRIPTION

It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

The figures and text therein illustrate and discuss examples of a craft that interacts with thrust fluid like a fish, through use of more than one torque reaction engine (TRE) secured to a fin.

As discussed herein, "thrust fluid" may include a gas, a liquid, a plasma or other media comprising mass, wherein the media may be accelerated by a moving fin, propeller, tubular curtain, or the like ("fin"), and wherein the fin may be moved by a motor or wherein the thrust fluid is of a stream of thrust fluid and the stream of thrust fluid moves the fin.

As used herein, "releasable," "connect," "connected," "connectable," "disconnect," "disconnected," and "disconnectable" refers to two or more structures which may be connected or disconnected, generally without the use of tools or chemical or physical bonding (examples of tools including screwdrivers, pliers, drills, saws, welding machines, torches, irons, and other heat sources) and generally in a repeatable manner. As used herein, "attach," "attached," or "attachable" refers to two or more structures or components which are attached through the use of tools or chemical or physical bonding. As used herein, "secure," "secured," or "securable" refers to two or more structures or components which are either connected or attached.

U.S. patent application Ser. No. 15/101,901 discloses a torque reaction engine (TRE), which may be used in a watercraft to achieve a fish-like motion. The resulting craft swims like a fish or marine mammal, without the myriad parts that plague other mechanical craft that attempt to swim like a fish or marine mammal.

As used herein, a central shaft may also be or be referred to as a "stator" or a "drive shaft" and the inertial mass may be or may be referred to as a "rotor". These identifiers are somewhat arbitrary, except inasmuch as they distinguish a first component and a second component, wherein one of the two components carries an inertial mass, and wherein the first and second components may rotate relative to one another around a common axis.

As discussed herein, each torque reaction engine (TRE) comprises a central shaft (or "driveshaft") secured to a portion of a hull, beam, and/or fin of a craft (collectively referred to as "hull"), an inertial mass located around or within the central shaft, wherein an engine may be located between and/or may comprise the inertial mass and the central shaft. The engine causes the inertial mass to change its acceleration around, within, or relative to the central shaft, such as by slowing down, speeding up, or reversing rotation of the inertial mass. A bearing or set of bearings may be located between the inertial mass and the driveshaft. The bearing or set of bearings may allow the inertial mass and driveshaft to rotate relative to one another; rotation of these components relative to one another may include rotation about a common central axis of rotation. The inertial mass may comprise, for example, lead, iron, steel, a pack of batteries, a lead-acid paste battery, a lead-acid paste battery in a toroidal shape, an electromagnet, a heavy or dense object, and the like. Torque reaction produced on the central shaft by change in acceleration of the inertial mass by the engine causes the central shaft and the hull (or portion of hull) secured to such central shaft to rotate, opposite the change in acceleration of the inertial mass.

The central shaft may be secured to the interior of an isolation or pressure vessel. The pressure vessel may contain the TRE and form its exterior surface that is secured to the remainder of the hull. The pressure vessel is also referred to herein as "portion of a hull". The pressure vessel may seal the electronic components away from the surrounding thrust fluid, such as surrounding water.

Unlike conventional craft that accelerate thrust fluid through use of a propeller connected to a motor via a driveshaft, there may be no penetration in the pressure vessel of a TRE for a moving component, such as a driveshaft. In conventional inboard watercraft, the driveshaft typically penetrates the hull, requiring a seal around the spinning driveshaft. The driveshaft seal presents a problem for conventional craft. It can leak and degrade. It is a source of friction. It costs money to fabricate and maintain. In craft that go deep in water (e.g., more than several hundred feet), to prevent high pressure water from leaking through the driveshaft seal, a complex labyrinth seal may be used or an electric motor connected to the propeller may be flooded with oil. The labyrinth seal or oil may prevent water from contaminating the motor; however, labyrinth seals still have depth limitations and are a source of drive train friction and flooding a motor with oil significantly decreases its operating efficiency. Penetrations in the hull to accommodate a moving component such as a driveshaft are a real and severe problem that limits depth and operating range.

In contrast in a TRE, there does not have to be a penetration in the pressure vessel or hull for a moving component, because the central shaft (or driveshaft) is secured to the interior of the pressure vessel.

The pressure vessel may be toroidal in shape, such that a passage passes through a center of the central shaft. However, the passage through the center of the central shaft in a toroidal pressure vessel does not penetrate the toroidal pressure vessel. Such a passage may be used to secure a harness to the craft, to exhaust heat from the TRE, as a location for environmental sensors, or as a conduit for transmitting data, signals, or power into an interior of the TRE.

The engine may be located between and/or may comprise one or more of the inertial mass and the driveshaft. The engine causes the inertial mass to change its acceleration vector relative to the driveshaft, such as by slowing down, speeding up, or reversing rotation of the inertial mass relative to the driveshaft. Torque reaction produced on the driveshaft by change in acceleration vector of the inertial mass by the engine causes the driveshaft and portion of the hull secured to such driveshaft to experience a torque reaction. If the portion of the hull is not held in place by an external object, the torque reaction on the driveshaft will cause the portion of the hull to rotate, opposite a change in acceleration vector of the inertial mass.

The TRE may be controlled by a controller to cyclically reverse an acceleration vector of the inertial mass. Torque reaction on the driveshaft by cyclic reversal of the acceleration vector of the inertial mass causes the driveshaft to cyclically rotate in a first direction (such as clockwise), then in a second direction (such as counterclockwise), then in the first direction, etc., opposite the acceleration vector of the inertial mass, so long as power is available and the controller comprises suitable instructions. Cyclic rotation of the driveshaft in the first and second directions may be referred to herein as, "cyclic oscillation".

During a first phase of operation of a TRE, the motor may apply power to accelerate the inertial mass. During a second phase of operation of the TRE, the motor may apply a brake to decelerate the inertial mass. The motor may be an electric motor or an internal combustion motor. The brake may generate power, such as when the motor is an electric motor and the brake is an electronic or magnetic brake or such as when the motor is an internal combustion engine and the brake compresses a system to compress gas or accelerate a fly wheel.

In an example discussed herein, the driveshaft of a TRE is secured to a craft. The driveshaft may be secured to a hull of the craft, a pressure vessel and/or isolation capsule surrounding the TRE, a beam, or the like ("beam" or "pressure vessel"). At least a fin is secured to the pressure vessel. Cyclic oscillation of the driveshaft is communicated to the fin by the pressure vessel, resulting in translation of the fin, back and forth, through a surrounding thrust fluid, resulting in acceleration of the thrust fluid. Acceleration of thrust fluid results in thrust and/or lift on the fin, which may propel the craft. The TRE may be operated in reverse, to generate power from a moving stream of thrust fluid surrounding a TRE-containing craft.

A flexible material secured to the driveshaft may flex in response to movement of the driveshaft. Such flex may compress and/or expand the flexible material, such as between at least first and second shapes. The flexible material may store energy as it compresses or expands. The flexible material may release stored energy and return to an original or resting shape, as may occur when the central shaft stops moving; alternatively, the flexible material may be pliable and/or may not store appreciable energy. The flexible material may have one or more states of strain deformation. The flexible material may transition between at least first and second shapes in response to or as allowed by movement of at least a first and a second TRE and/or in response to or as allowed by release or storage of energy in the flexible material, which may result in movement of strain deformations along the flexible material.

The flexible material may comprise rubber, polyurethane, nylon, carbon fiber, carbon fiber embedded in resin, gelatin, gelatin produced by a living organism, fiberglass, aramid, or the like.

The flexible material may have a first shape, wherein the first shape may be the shape of a curtain, a curtain comprising a wave due to a strain deformation, a tubular curtain, a beam, or the like, wherein the first shape may be a resting shape, and/or wherein the first shape may store or comprise a different amount of energy relative to a second shape, wherein the energy may be potential energy.

The flexible material may have at least a second shape. The second shape may be a mirror image of the first shape, and/or a compressed, stretched, expanded, or bent version of the first shape.

Transition between the first and second shapes may be caused by and/or may produce a wave. The wave may traverse the flexible material or may be a standing wave in the flexible material. The wave may store or release energy in a local portion of the flexible material. The wave may be produced by a movement of at least one TRE. One TRE may move relative to at least a second TRE; movement of more than one TRE may be in phase or out of phase.

One or more tendons may span between the TRE and the flexible material. The tendons may hold the TRE within the craft and/or the wing to the TRE. The tendons may comprise fibers, rods, or the like. Rods may comprise joints, such as at the ends of the rods, where the rods contact the TRE and the flexible material.

Flexure of the curtain caused by a TRE may cause a wave to propagate along the curtain; more than one TRE may move relative to one another to cause a propagating wave ("wave") or a standing wave to form in the curtain between at least two of the TREs. Propagation of the wave along the curtain may be performed to accelerate thrust fluid and produce thrust. Production of a standing wave may be performed to bend the curtain. Bending the curtain may be performed to steer the craft. Production of the propagating wave and production of the standing wave may be performed simultaneously.

FIG. 1A illustrates an example of a robotic or mechanical fish ("robotic fish 101"). Robotic fish 101 may comprise TRE 110, TRE 102, and wing 105. Wing 105 may be secured as part of or to robotic fish 101 by a central wing rod 108. Central wing rod 108 may pass through a leading edge of wing 105 or, as illustrated, through a center of displacement, lift or the like in wing 105. When allowed to rotate about a center of displacement, wing 105 may not generate thrust or lift when wing 105 is rotated through surrounding thrust fluid, unless the trailing edge of wing 105 is behind or ahead of the leading edge. More than two wings may be present.

The trailing and leading edges of wing 105 may be driven by two or more separate TRE. In the example illustrated in FIG. 1A, TRE 110 and TRE 102. The TRE may be driven at an off-set phase, so that trailing edge may be driven behind or ahead of the leading edge.

Figure 1B:
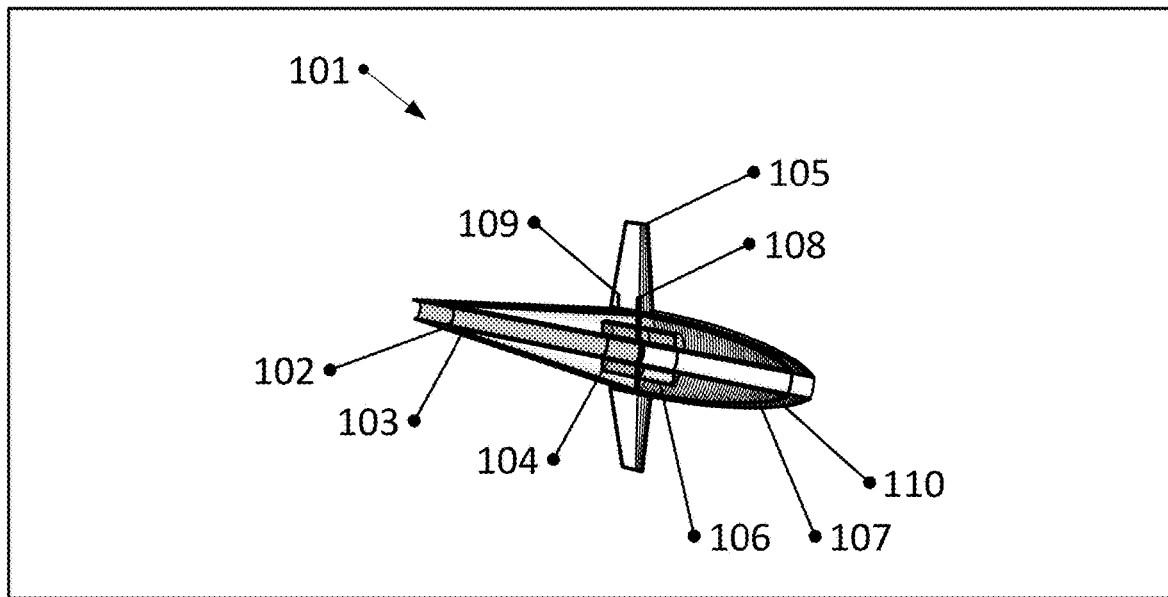
FIG. 1B illustrates the robotic fish of FIG. 1A, with a section view of internal components.

FIG. 1B illustrates the robotic fish of FIG. 1A, with a section view of internal components, including central wing rod 108, aft inertial-mass 103, aft motor 104, fore motor 106, fore inertial-mass 107. Identifier "110" labels both TRE 110 and the external shell of a toroidal pressure vessel, secured to drive-shaft of motor 106. Toroidal pressure vessel 110 encloses all of the components of TRE 110. Similarly, identifier "102" labels both TRE 102 and the external shell of a toroidal pressure vessel, secured to drive-shaft of motor 104. Toroidal pressure vessel 102 encloses all of the components of TRE 102.

As illustrated in FIGS. 1A and 1B, TRE 102 and 110 may be in contact. TRE 102 may be secured to a portion of wing 105 behind the securement location for TRE 110. TRE 102 may be secured via a rod, a ring, a bearing, etc. TRE 102 and 110 may move toward and away from one another as they operate, due to a shorten distance between the TRE as the respective securement points for the respective TRE move further and closer to one another, as the TRE operate.

Figure 2A:
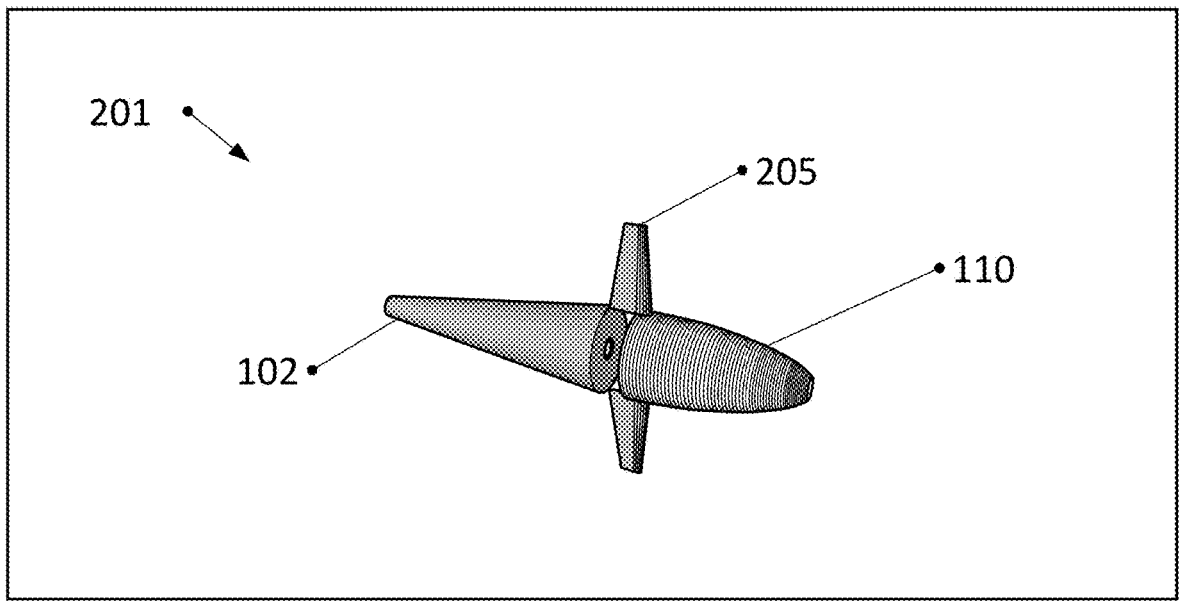
FIG. 2A illustrates an example of a robotic fish including a first and a second torque reaction engine, wherein the first torque reaction engine is secured to a fore-portion of a wing and the second torque reaction engine is secured to an aft-portion of the wing.

FIG. 2A illustrates an example of a robotic fish including a first and a second torque reaction engine, wherein the first torque reaction engine is secured to a fore-portion of a wing and the second torque reaction engine is secured to an aft-portion of the wing.

Figure 2B:
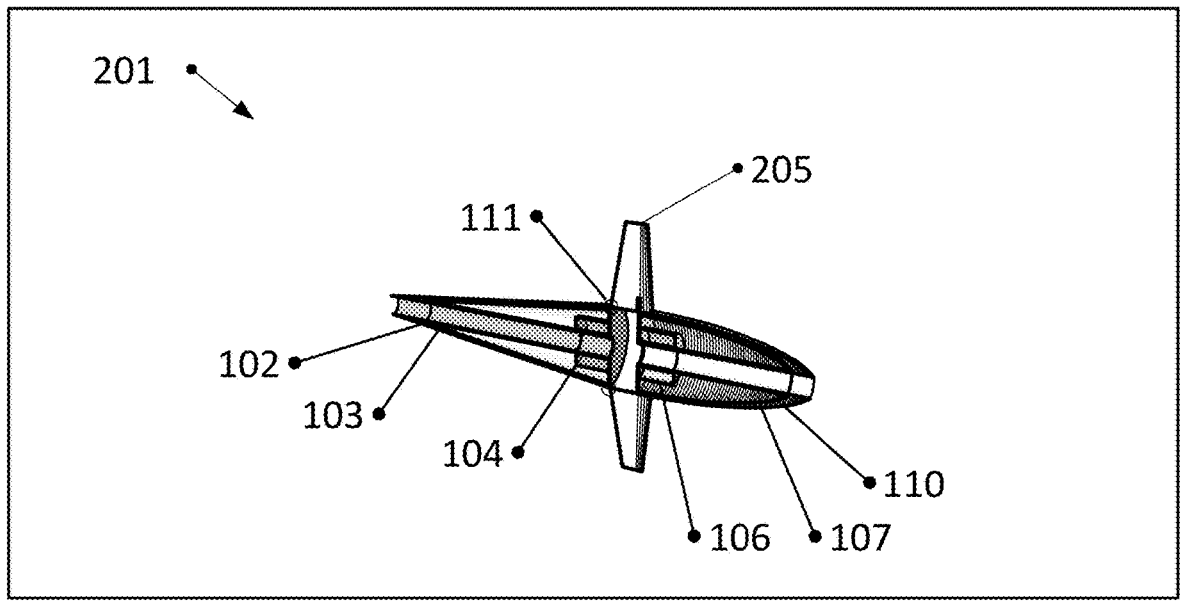
FIG. 2B illustrates the robotic fish of FIG. 2A, with a section view of internal components.

FIG. 2B illustrates the robotic fish of FIG. 2A, with a section view of internal components.

Figure 3A:
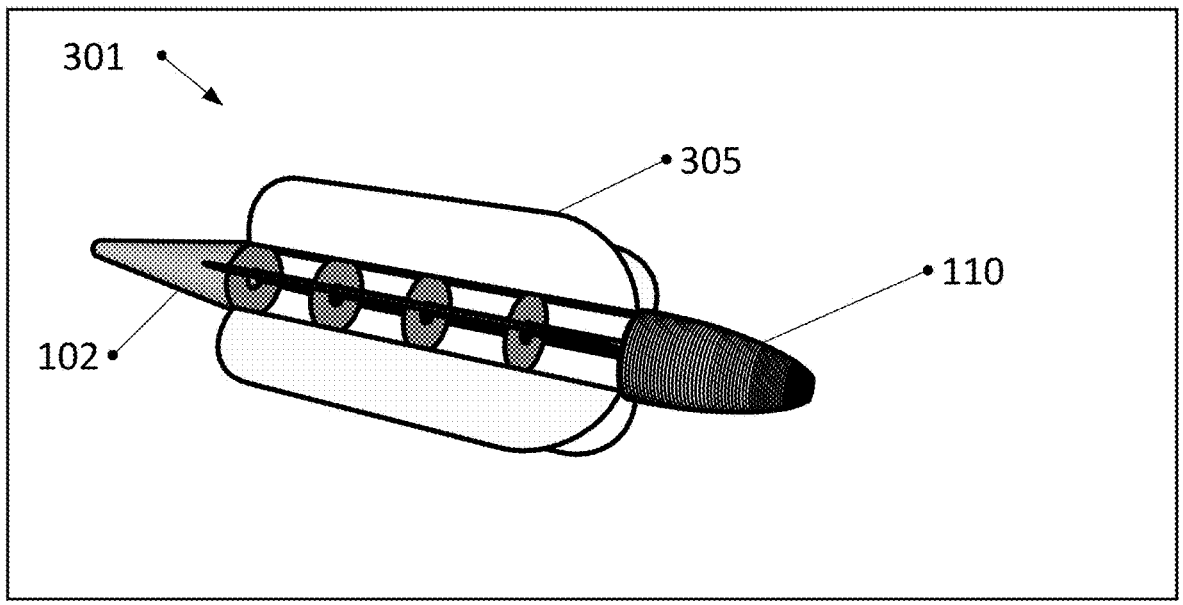
FIG. 3A illustrates an example of a robotic fish including a first and a second torque reaction engine, wherein the first torque reaction engine is secured to a fore-portion of a flexible wing and the second torque reaction engine is secured to an aft-portion of the flexible wing.

FIG. 3A illustrates an example of a robotic fish including a first and a second TRE 110 and 102, wherein TRE 110 is secured to a fore-portion of a flexible wing 305 and TRE 102 is secured to an aft-portion of flexible wing 305.

Figure 3B:
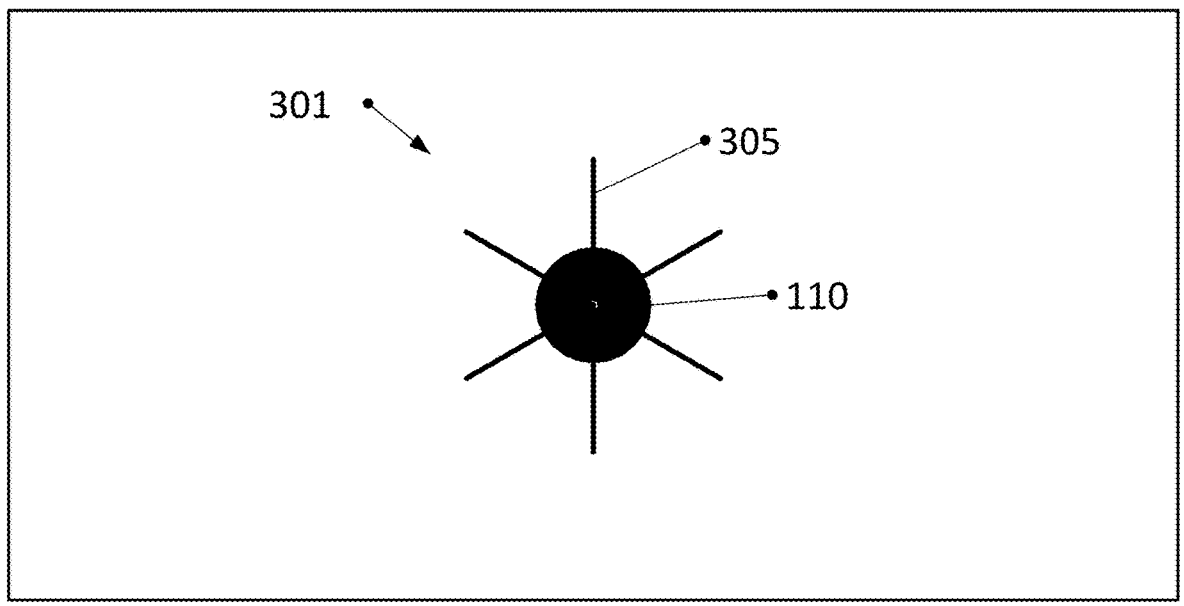
FIG. 3B illustrates the robotic fish of FIG. 3A, in a front view.

FIG. 3B illustrates the robotic fish of FIG. 3A, in a front view.

Figure 4A:
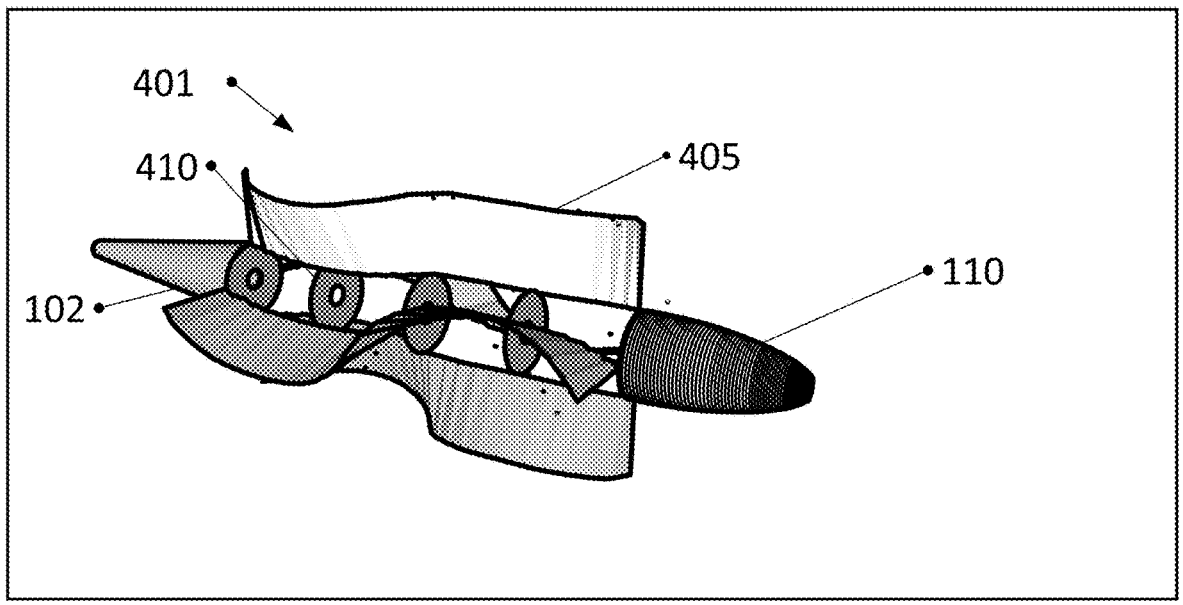
FIG. 4A illustrates the robotic fish of FIG. 3A, during a phase of motion of the torque reaction engines.
Figure 5:
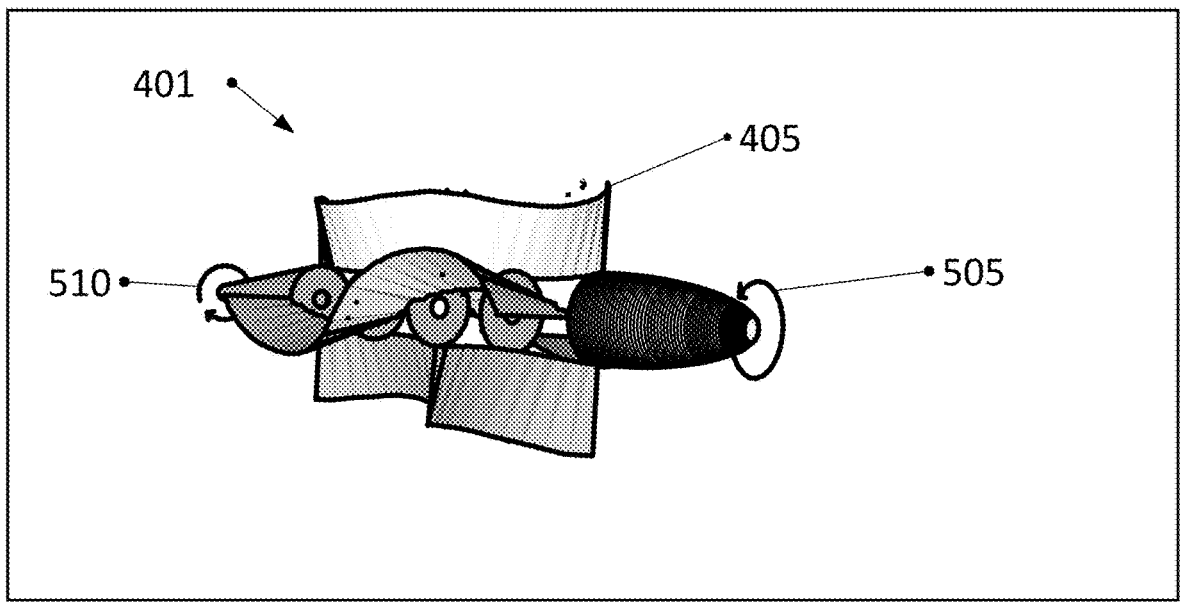
FIG. 5 illustrates the robotic fish of FIG. 4A, illustrating rotation of TRE.

FIG. 4A illustrates robotic fish 401 comprising flexible wing 405 under strain. TRE 110 and TRE 102 may cyclically counter-rotate, opposite one another, as illustrated in FIG. 5. During a first phase of operation of the TRE, TRE 110 may operate in a counter-clockwise direction, with the inertial mass internal to the pressure vessel rotating in a clockwise direction. During a second phase of operation of the TRE, TRE 110 may operate in a clockwise direction, with the inertial mass internal to the pressure vessel rotating in a counter-clockwise direction. Operation of the TRE in this manner may cause the strain in flexible wing 405 to flip biases and transmit a wave up or down the craft. Strain in flexible wing 405 may be present at all times or only during operation of TRE 102 and 110.

Internal frame 410 may be present. Internal frame 410 may be secured to an interior edge of flexible wing 405. Internal frame 410 may be biased to induce a curve in robotic fish 401.

TRE 102 and 110 may be elongated toward one another, such as along a leading stem, in the case of TRE 102, or trailing stem, in the case of TRE 110. Such stems may loosely contact an interior of internal frame 410. Such stems may contact one another at, for example, a ball socket. The mechanism to bias internal frame 410 may use a swashplate on either side of such a ball socket. When internal frame 410 is not biased, central axis of TRE 102 and 110 align. When internal frame 410 is biased, central axis of TRE 102 and 110 no longer align.

Flexure of flexible wing 405 and/or strain in flexible wing 405 may be adjusted by an adjustable distance between the TRE and/or by a curve-inducing bias between the TRE and/or by a flexure control mechanism. The flexure control mechanism may comprise a spring between the wing and the TRE. The spring may have adjustable tension or flexure. The spring may effect the angle of attack of the wing through a surrounding thrust fluid; for example, the spring may delay or advance the angle of attack of the wing. The flexure control mechanism may passively decrease the angle of attack of the wing when the wing is producing greater thrust and may passively increase the angle of attack of the wing when the wing is producing less thrust.

Figure 4B:
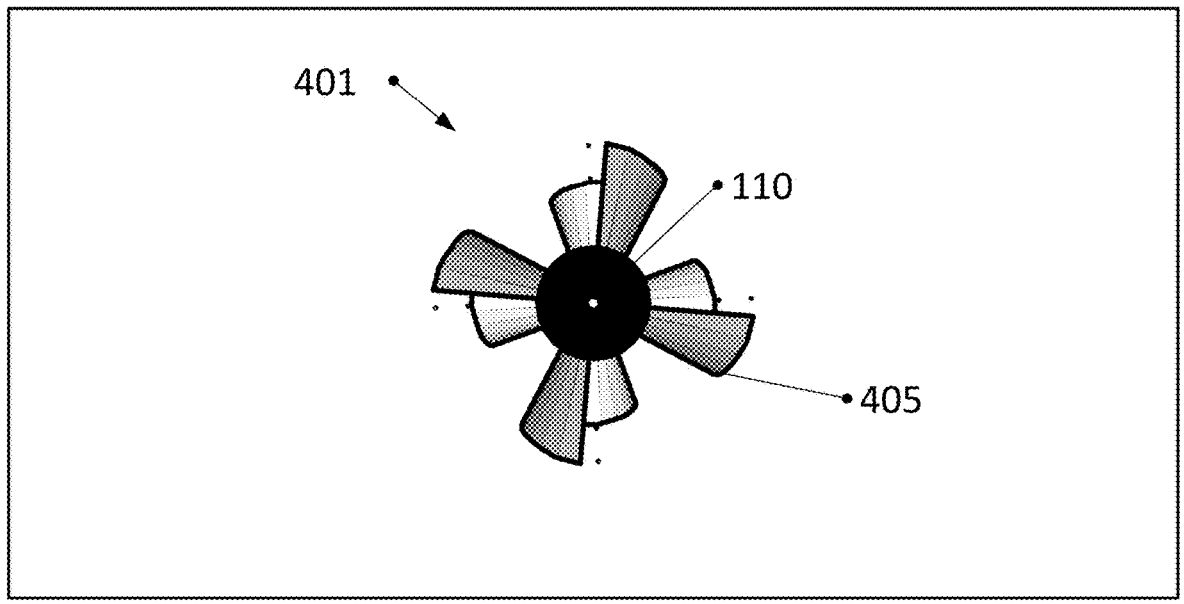
FIG. 4B illustrates the robotic fish of FIG. 4A, in a front view.

FIG. 4B illustrates the robotic fish of FIG. 4A, in a front view.

Robotic fish disclosed herein may comprise one or motor controllers, to control cyclic oscillation of TRE. Robotic fish may comprise one or more power controllers, to control a battery pack in the inertial mass of the TRE and the supply of power to TRE.

A robotic fish may comprise acoustic and chemical sensors and emitters, as well as radio frequency sensors and emitters.

Buoyancy for robotic fish may be provided at least in part by flexible material and/or by one or more displacement volume(s) within TRE. Displacement volume(s) may comprise, for example, a vacuum, a gas or a liquid that is lighter or heavier than a surrounding thrust fluid. A volume of such vacuum, gas, or liquid may be increased or decreased within the displacement volume, such as by a pump, a piston, a valve or the like. The displacement volume may, for example, occupy one or more sectors of the TRE. The vacuum, gas, or liquid may be pumped or allowed to pass between within the sectors to relocate the center of displacement of the robotic fish.

The center of mass of the robotic fish may be changed by changing the location of the TRE. Buoyancy may be adjustable, to increase or decrease buoyancy.

Robotic fish may comprise bearings. Inertial mass may comprise within the space indicated by inertial mass, a battery pack, a radial battery, a radial battery pack, lead, iron, a permanent magnet, an electromagnet, or a similar dense material. An outer shell of a TRE motor may comprise permanent magnets, electromagnets, or the like. A motor may be formed from, between, or comprise outer shell and inertial mass, wherein the motor changes a rate of acceleration of inertial mass and subjects a drive shaft of the motor to a torque reaction cause thereby, and transfers this torque reaction to the outer shell via the drive shaft. Electrical power may be transferred to a battery pack or the like within inertial mass through induction, through brushes (not illustrated), through a slip ring (not illustrated), or the like.

The invention claimed is:

1. A robotic fish comprises a plurality of torque reaction engines, wherein each torque reaction engine in the plurality of torque reaction engines comprises a driveshaft, an inertial mass mounted around the driveshaft, and a motor, wherein the motor is to generate a torque on the driveshaft by changing an acceleration vector of the inertial mass relative to the driveshaft, and a fish body, wherein the torque on the driveshaft from changing the acceleration vector of the inertial mass relative to the driveshaft is to cause a wave to propagate across the fish body, including through a flexible wing, wherein the wave is to accelerate thrust fluid and propel the robotic fish.

2. The robotic fish according to claim 1, wherein the flexible wing is to store energy as it compresses or expands.

3. The robotic fish according to claim 1, wherein the flexible wing is to transition between a first shape and a second shape in response to or as allowed by movement of a first torque reaction engine and a second torque reaction engine in the one or more torque reaction engines.

4. The robotic fish according to claim 3, wherein the transition between the first shape and the second shape comprises a strain deformation in the flexible wing.

5. The robotic fish according to claim 1, wherein the wave is to traverse the flexible wing as a propagating wave.

6. The robotic fish according to claim 1, wherein each torque reaction engine in the plurality of torque reaction engines further comprises a pressure vessel.

7. The robotic fish according to claim 6, the pressure vessel is toroidal.

8. The robotic fish according to claim 1, further comprises a flexure control mechanism.

9. The robotic fish according to claim 8, wherein the flexure control mechanism comprises a spring between at least one torque reaction engine in the plurality of torque reaction engines and the flexible wing.

10. The robotic fish according to claim 9, wherein the spring is to delay or advance an angle of attack of the wing.

* * * * *